(No Model.)

C. P. MOSHER.
EYE SHADE.

No. 569,117. Patented Oct. 6, 1896.

Witnesses
Geo. E. Fuch.
James W. Bevans

Inventor
C. P. Mosher,
By Attorney's
Pattison Nesbit.

UNITED STATES PATENT OFFICE.

CHARLES PHILO MOSHER, OF GROTON, NEW YORK, ASSIGNOR OF ONE-HALF TO JOHN S. KIRKENDALL, OF ITHACA, NEW YORK.

EYE-SHADE.

SPECIFICATION forming part of Letters Patent No. 569,117, dated October 6, 1896.

Application filed March 5, 1896. Serial No. 581,925. (No model.)

*To all whom it may concern:*

Be it known that I, CHARLES PHILO MOSHER, of Groton, in the county of Tompkins and State of New York, have invented certain new and useful Improvements in Attachments for Spectacles and Eyeglasses; and I do hereby declare the following to be a full, clear, and exact description of the invention, such as will enable others skilled in the art to which it pertains to make and use it, reference being had to the accompanying drawings, which form part of this specification.

My invention relates to improvements in attachments for spectacles or eyeglasses.

The object of my invention is to provide an attachment for spectacles or eyeglasses consisting of a disk or disks having attaching means for connecting it adjacent the glasses, whereby a shade or protector is provided for the eyes of the wearer of the glasses.

Figure 1:
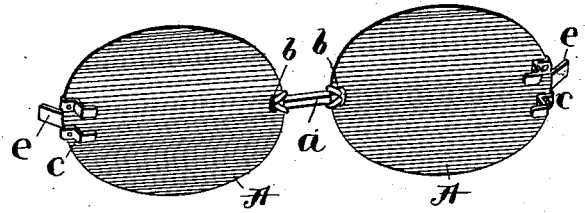
Figure 2:
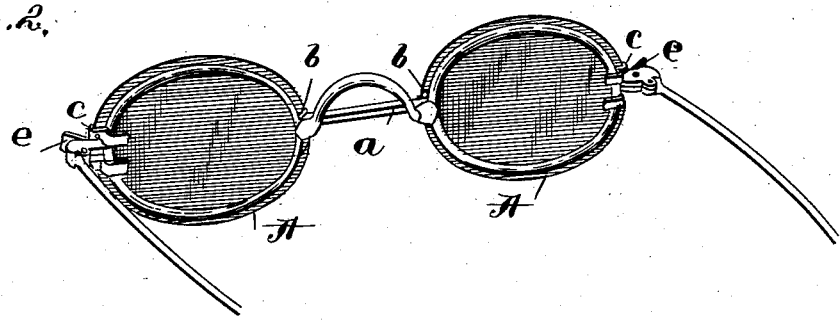
Figure 3:
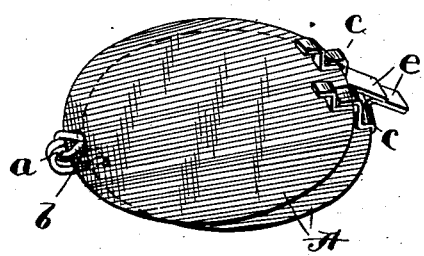
Figure 4:
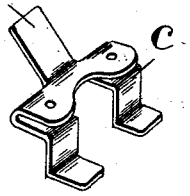

In the accompanying drawings, Figure 1 is a detached perspective view of an attachment embodying my invention. Fig. 2 is a view showing it applied to spectacles. Fig. 3 is a detached view showing them folded. Fig. 4 is an enlarged detached view of the interlocking device.

Referring now to the drawings, A indicates two disks, which are preferably made of an oval shape, corresponding to the shape of the glasses of spectacles or eyeglasses, and these disks will be made of any desired material. If they are intended for shades to be worn in the sun, they will be of any desired color, blue or smoked. I find that celluloid is well adapted for my purposes where they are to be used as semitransparent shades; but of course it will be understood that where a more positive or even an absolute shade is desired the material may be opaque without departing in any manner from my invention.

The two disks are used. The inner edges are connected by a yielding ligament $a$, which for cheapness and convenience is here shown as formed of a rubber band, which is doubled through openings $b$, formed in the inner edges of the glasses.

The outer edges of the disks have interlocking arms $c$ at the inner sides thereof, adapted to engage the outer edges of the frame of the glasses or the glasses themselves of either spectacles or eyeglasses, and in the event of spectacles the projections forming the hinges at the outer edges of the lens or glasses extend between the said arms $c$, as shown in Fig. 2. These arms form interlocking devices and are preferably riveted, though they may be secured in any other manner to the disks.

Formed from the same metal piece as the interlocking arms are the outwardly-projecting handles $e$, by means of which the disks are applied to either spectacles or eyeglasses by the wearer without removing them from his nose.

When applied as shown in Fig. 2, it will be readily understood that the yielding ligament between the disks is under tension, so that they are drawn and held tightly and closely to the glasses of either the spectacles or the eyeglasses, and can be instantly removed or replaced, as the wearer may desire.

As shown in the drawings, Fig. 3, they are adapted to be conveniently folded together and placed in the pocket, where they take up little or no space, or placed in the case of the owner.

It will be readily understood that this same idea may be applied by having the outer edges of the disks themselves turned inward and adapted to engage the frames or the glasses themselves of the spectacles or eyeglasses, as the case may be, so long as an engaging means is provided at the outer edge for attachment to the glasses.

By means of the elastic connection of the ligament $a$ the attachment is adapted to fit glasses of varying sizes or spectacles varying considerably in respect to the distance between the outer edges of the lens-frames. This attachment is adapted to fit any-sized glass and to be instantly applied and instantly released simply by a longitudinal pull upon the handles $e$. The arms $c$, as shown, extend inward over and parallel with the faces or planes of the shade proper and are separated to span the central connection of the spectacles, as clearly illustrated in Fig. 2.

Having thus fully described my invention, what I claim, and desire to secure by Letters Patent, is—

1. An attachment for spectacles or eyeglasses consisting of two disks having interlocking projections at their outer edges adapted to receive the spectacle-frame, and an elastic connection at their inner edges uniting the said disks whereby they are adapted to be applied to glasses of various sizes, and attached and detached by a longitudinal stretching of the elastic connection, substantially as described.

2. An attachment for spectacles or eyeglasses consisting of two disks having at their outer edges inwardly-extending parallel arms, the arms projecting inward substantially parallel with the faces or planes of the disks, and an elastic connection connecting the disks at their inner edges whereby they are adapted for attachment and detachment by a longitudinal separation of the disks, substantially as described.

3. An attachment for eyeglasses or spectacles consisting of a disk having at its outer edges interlocking arms for engagement with the spectacles or eyeglasses, the said interlocking arms having outwardly-projecting handles.

4. An attachment for spectacles or eyeglasses having at its outer edges engaging or interlocking means at the inner sides thereof, and oppositely-projecting handles at the outer edges for the purpose described.

In testimony whereof I affix my signature in presence of two witnesses.

CHARLES PHILO MOSHER.

Witnesses:
 M. A. DOWNING,
 H. G. MOE.